US012748049B2

(12) United States Patent
Wong

(10) Patent No.: US 12,748,049 B2
(45) Date of Patent: Sep. 29, 2026

(54) PLASMONIC DEVICE

(71) Applicant: Ostia Technologies Limited, Salford (GB)

(72) Inventor: Ka Wai Wong, Salford (GB)

(73) Assignee: Ostia Technologies Limited, Blue Media City (GB)

(*) Notice: Subject to any disclaimer, the term of this patent is extended or adjusted under 35 U.S.C. 154(b) by 67 days.

(21) Appl. No.: 18/617,894

(22) Filed: Mar. 27, 2024

(65) Prior Publication Data

US 2025/0305952 A1 Oct. 2, 2025

(51) Int. Cl.

| | |
|---|---|
| ***G01N 21/552*** | (2014.01) |
| ***B82Y 15/00*** | (2011.01) |
| ***B82Y 30/00*** | (2011.01) |
| ***B82Y 40/00*** | (2011.01) |
| ***G01N 21/65*** | (2006.01) |

(52) U.S. Cl.

CPC ............ *G01N 21/554* (2013.01); *B82Y 15/00* (2013.01); *B82Y 30/00* (2013.01); *B82Y 40/00* (2013.01); *G01N 21/658* (2013.01); *G01N 2201/1087* (2013.01)

(58) Field of Classification Search

CPC ............... G01N 21/554; G01N 21/658; G01N 2201/1087; B82Y 15/00; B82Y 30/00; B82Y 40/00

See application file for complete search history.

(56) References Cited

U.S. PATENT DOCUMENTS

| | | | | |
|---|---|---|---|---|
| 2011/0166045 | A1* | 7/2011 | Dhawan | B82Y 15/00 257/467 |
| 2017/0192351 | A1* | 7/2017 | Yang | G03F 7/0002 |
| 2017/0242163 | A1* | 8/2017 | Aksyuk, IV | G02B 1/002 |
| 2018/0003705 | A1* | 1/2018 | Koder | G01N 21/554 |
| 2020/0141871 | A1* | 5/2020 | Chang | G01N 33/587 |
| 2020/0223206 | A1* | 7/2020 | Najiminaini | B81C 1/00634 |

FOREIGN PATENT DOCUMENTS

WO WO-2015135450 A1 * 9/2015 ........... G01N 21/658

OTHER PUBLICATIONS

English machine translation of WO2015135450A1 (Year: 2015).*

Kumar, Panangattukara Prabhakaran Praveen, Shimayali Kaushal, and Dong-Kwon Lim. "Recent advances in nano/microfabricated substrate platforms and artificial intelligence for practical surface-enhanced Raman scattering-based bioanalysis." TrAC Trends in Analytical Chemistry 168 (2023): 117341. (Year: 2023).*

Altug, Hatice, et al. "Advances and applications of nanophotonic biosensors." Nature nanotechnology 17.1 (2022): 5-16.

(Continued)

*Primary Examiner* — Dominic J Bologna

(74) *Attorney, Agent, or Firm* — Muir Patent Law, PLLC

(57) ABSTRACT

A plasmonic substrate fabrication method is formed using sacrificial nanostructures or microstructures of removable materials printed onto a substrate, and subsequent deposition or growth of a material such as metal or graphene. After the sacrificial structures are removed, plasmonic hotspots of nanoscale or microscale dimension and geometry are obtained on the substrate, enabling various sensing and detection of analytes based on plasmonic techniques.

25 Claims, 16 Drawing Sheets

(56) References Cited

OTHER PUBLICATIONS

Jeon, Tae Yoon, et al. "Nanostructured plasmonic substrates for use as SERS sensors." Nano Convergence 3 (2016): 1-20.
Li, Chunchun, et al. "Towards practical and sustainable SERS: a review of recent developments in the construction of multifunctional enhancing substrates." Journal of Materials Chemistry C 2021 9, (2021): 11517-11552.
Minopoli, Antonio, et al. "Nanostructured surfaces as plasmonic biosensors: A review." Advanced Materials Interfaces 9.2 (2022): 2101133 (1-29).
Strobbia, Pietro, Eric Languirand, and Brian M. Cullum. "Recent advances in plasmonic nanostructures for sensing: a review." Optical Engineering 54.10 (2015): 100902-1 to 100902-21.
A. Reina, X. Jia, J. Ho, D. Nezich, H. Son, V. Bulovic, M. S. Dresselhaus, "J. Kong, Large area, few-layer graphene films on arbitrary substrates by chemical vapor deposition", Nano Letters, 2009, 9, 30-35.
J. Jang, M. Son, S. Chung, K. Kim, C. Cho, B. H. Lee, M. Ham, "Low-temperature-grown continuous graphene films from benzene by chemical vapor deposition at ambient pressure", Scientific Reports, 2015, 5, 17955.
K. Peng, C. Wu, Y. Lin, Y. Liu, D. Tsai, Y. Pai, G. Lin, "Hydrogen-free PECVD growth of few-layer graphene on an ultra-thin nickel film at the threshold dissolution temperature", Journal of Materials Chemistry C, 2013, 1, 3862-3870.
L. Cheng, K. Yun, A. Lucero, J. Huang, X. Meng, G. Lian, H. Nam, R. M. Wallace, M. Kim, A. Venugopal, L. Colombo, J. Kim, "Low temperature synthesis of graphite on Ni films using inductively coupled plasma enhanced CVD", Journal of Materials Chemistry C, 2015, 3, 5192-5198.
M. Li, S. K. Cushing, N. Wu, "Plasmon-enhanced optical sensors—a review", Analyst, 2015, 140, 386-406.
Q. Yu, J. Lian, S. Siriponglert, H. Li, Y. P. Chen, S. Pei, "Graphene segregated on Ni surfaces and transferred to insulators", Applied Physics Letters, 2008, 93, 113103.
R. H. Ritchie, "Plasma losses by fast electrons in thin films", Physical Review, 1957, 106(5), 874-881.
S. Huang, C. Song, G. Zhang, H, Yan, "Graphene plasmonics: physics and potential applications", Nanophotonics, 2017. 6(6), 1191-1204.
S. Kumar, S. Seo, "Plasmonic sensors—a new frontier in nanotechnology", Biosensor, 2023, 13, 385.
V. E. Babicheva, "Optical processes behind plasmonic applications", Nanomaterials, 2023 (13), 1270.
X. Li, W. Cai, J. An, S. Kim, J. Nah, D. Yang, R. Piner, A. Velamakanni, I. Jung, E. Tutuc, S. K. Banerjee, L. Colombo, R. S. Ruoff, "Large-area synthesis of high-quality and uniform graphene films on copper foils", Science, 2009, 324, 1312-1314.
Y. Zhang, L. Zhang, C. Zhou, "Review of chemical vapor deposition of graphene and related applications", Accounts of Chemical Research, 2013, 40(10), 2329-2339.

* cited by examiner

PLASMONIC DEVICE

BACKGROUND

Technical Field

The disclosed technology pertains to the fabrication of a plasmonic device with controllable nanoscale features (e.g. size, morphology, density, and arrangement), enabling various surface plasmonic effects such as for chemo-sensing, biosensing and photothermal applications.

This application is related to U.S. patent application Ser. Nos. 18/316,968 and 18/316,974, both to Ka Wai Wong and filed on May 12, 2023, the subject matter of each being incorporated herein in their entirety.

Background Art

Surface plasmons were first discovered by Rufus Ritchie in 1957, which initiated extensive studies by scientists worldwide. The full effect of Ritchie's discovery became clear only years later with the advent of nanotechnology in the late 1990s. (R. H. Ritchie, "Plasma losses by fast electrons in thin films", Physical Review, 1957, 106 (5), 874-881)

Surface plasmons (SPs) can be defined as coherent oscillations of conducting electrons present at the interface of two materials (e.g., a metal-dielectric interface, such as a metal sheet in air) when subjected to stimulation of an incident electromagnetic wave (e.g., photons, electrons, and phonons) at a certain wavelength.

Studies have focused on two primary forms of surface plasmons: the localized surface plasmons (LSPs) and propagating surface plasmon polaritons (SPPs). Both are key elements in plasmonic sensors. The intense fields created by these plasmons can significantly enhance the light-matter interactions, such as transmission, Raman scattering, and fluorescence, and can even lead to significant localized heating known as plasmonic heating. As such, different sensing and detection schemes based on plasmonic phenomena can be achieved, for instance, surface enhanced Raman spectroscopy (SERS), surface enhance fluorescence (SEF) and surface enhanced infrared absorption spectroscopy (SEIRA).

Further, the recent emergence of plasmonic nanostructures has accelerated the development of various applications based on surface plasmonic effects because a highly localized amplification of the electromagnetic field results within a few nanometres of a nanostructure, leading to a strong localized surface plasmons resonance (LSPR). (M. Li, S. K. Cushing, N. Wu, "Plasmon-enhanced optical sensors—a review", Analyst, 2015, 140, 386-406) Further, an array of nanostructures offers a resonator architecture exhibiting high sensitivity, and extraordinary optical characteristics.

Compared to traditional sensors, plasmonic-based sensing offers very high sensitivity, flexibility, quick response, and minute analyte amount possibilities. Structurally modified plasmonic sensing platforms can even provide enhanced efficiency and sensitivity. On the other hand, they offer a promising yet rapid diagnostic technique with the advantages of easy operation, minimal sample pretreatment, and simple inexpensive instrumentation.

Recent advancements in nanotechnology enable fabrication of plasmonic-based sensors by using micro- and nanofabrication techniques. However, most of them are complicated, costly, labour intensive, and in some cases very difficult to scale up.

On the other hand, to achieve plasmonic phenomena and derived detection, plasmonic materials, which should be designed and structured in a unique form to maximize the plasmonic effect for different detection schemes, are essential. Of all the metals reported for plasmonic sensors, Ag and Au are considered the most useful plasmonic materials, because they show the naturally lowest ohmic losses at optical frequencies, as well as due to their biocompatibility, and their stability (S. Kumar, S. Seo, "Plasmonic sensors—a new frontier in nanotechnology", Biosensor, 2023, 13, 385).

Recently, two-dimensional (2D) materials have been showing promise as materials for plasmonics. In particular, graphene has attracted much attention because of its high carrier mobility, high tunability through electrostatic gating or chemical doping, and the very strong light confinement exhibited by graphene plasmons (S. Huang, C. Song, G. Zhang, H, Yan, "Graphene plasmonics: physics and potential applications", Nanophotonics, 2017. 6 (6), 1191-1204).

Chemical vapor deposition (CVD) has been a method to synthesize graphene since early reports in 2008 and 2009 (Qingkai Yu, Jie Lian, Sujitra Siriponglert, Hao Li, Yong P. Chen, and Shin-Shem Pei, *Graphene segregated on Ni surfaces and transferred to insulators*, Applied Physics Letters, 2008, 93, 113103; Xuesong Li, Weiwei Cai, Jinho An, Seyoung Kim, Junghyo Nah, Dongxing Yang, Richard Piner, Aruna Velamakanni, Inhwa Jung, Emanuel Tutuc, Sanjay K. Banerjee, Luigi Colombo, and Rodney S. Ruoff, *Large-area synthesis of high-quality and uniform graphene films on copper foils*, Science, 2009, 324, 1312-1314; Alfonso Reina, Xiaoting Jia, John Ho, Daniel Nezich, Hyungbin Son, Vladimir Bulovic, Mildred S. Dresselhaus, and Jing Kong, *Large area, few-layer graphene films on arbitrary substrates by chemical vapor deposition*, Nano Letters, 2009, 9, 30-35). Briefly, a metal substrate, e.g., Ni, Cu, or other transition metals is used, upon which graphenes can be grown in different CVD conditions. Monolayer and few-layer graphene can be prepared on polycrystalline Ni, while the use of single-crystalline Ni (111) substrate can substantially increase the percentage of monolayer graphene grown. When a Cu substrate is used instead, single-layer graphene can be prepared. Zhang et. al. have reviewed CVD graphene (Yi Zhang, Luyao Zhang, and Chongwu Zhou, *Review of chemical vapor deposition of graphene and related applications*, Accounts of Chemical Research, 2013, 40 (10), 2329-2339).

Various low-temperature syntheses of graphene have been recently demonstrated. Plasma enhanced CVD methods were shown to be able to prepare graphene film at growth temperature as low as 380° C. to 500° C. (Kaung-Jay Peng, Chung-Lun Wu, Yung-Hsiang Lin, Yen-Ju Liu, Din-Ping Tsai, Yi-Hao Pai and Gong-Ru Lin, *Hydrogen-free PECVD growth of few-layer graphene on an ultra-thin nickel film at the threshold dissolution temperature*, Journal of Materials Chemistry C, 2013, 1, 3862-3870; Lanxia Cheng, Kayoung Yun, Antonio Lucero, Jie Huang, Xin Meng, Guoda Lian, Ho-Seok Nam, Robert M. Wallace, Moon Kim, Archana Venugopal, Luigi Colombo, and Jiyoung Kim, *Low temperature synthesis of graphite on Ni films using inductively coupled plasma enhanced CVD*, Journal of Materials Chemistry C, 2015, 3, 5192-5198). A low-temperature synthesis of continuous graphene by a modified CVD method with benzene on Cu at an even lower temperature of 100° C. to 300° C. was developed and reported by Jang et. al. (Jisu Jang, Myungwoo Son, Sunki Chung, Kihyeun Kim, Chunhum Cho, Byoung Hun Lee, and Moon-Ho Ham, *Low-temperature-grown continuous graphene films from benzene by chemical vapor deposition at ambient pressure*, Scientific Reports, 2015, 5, 17955).

The very recent development of low-temperature graphene allows fabrication of novel graphene-based devices which were not possible previously because of the high temperature involved.

As disclosed hereinbelow, new methods are disclosed for producing plasmonic devices using e.g., metal-based, and graphene-based plasmonic substrates, to form nanoscale plasmonic structures of controllable morphology, position, and density, made from plasmonic materials including metals, semiconductors, or 2D materials.

SUMMARY

A plasmonic device is fabricated by forming nanostructures of removable material on a substrate, performing direct deposition of plasmonic metal layer, semiconductor layer, or a 2D material layer, and removal of the nanostructures to produce a rigid or flexible device with nanoscale features, exhibiting plasmonic effects.

The nanostructures deposited may comprise a removable material, in which the material is removable by one or more of a solvent, heat, chemical treatment, and physical treatment.

In one configuration, the nanostructures are printed or deposited, for example by using 3D printing, nano-imprint, dip-pen lithography, laser writing or another suitable printing technique. By way of example, the material is printed or deposited at an aspect ratio having a height-to-width ratio up to 20.

BRIEF DESCRIPTION OF THE DRAWINGS

The descriptions that follow will be further understood when read with the appended drawings. There are shown in the drawings exemplary embodiments of the disclosed technology for illustration purpose. The invention is not limited to the specific methods, compositions, and devices disclosed. Further, the drawings are not necessarily drawn to scale or proportion.

FIG. 5A illustrates one hotspot from a bi-circular pattern, FIG. 5B illustrates three hotspots from a tri-circular pattern, FIG. 5C illustrates five hotspots from a tetra-circular pattern, FIG. 5D illustrates one hotspot from two opposite triangles, FIG. 5E illustrates one hotspot from two squares, and FIG. 5F illustrates four hotspots from a cluster of four squares.

DETAILED DESCRIPTION

Figure 1A:
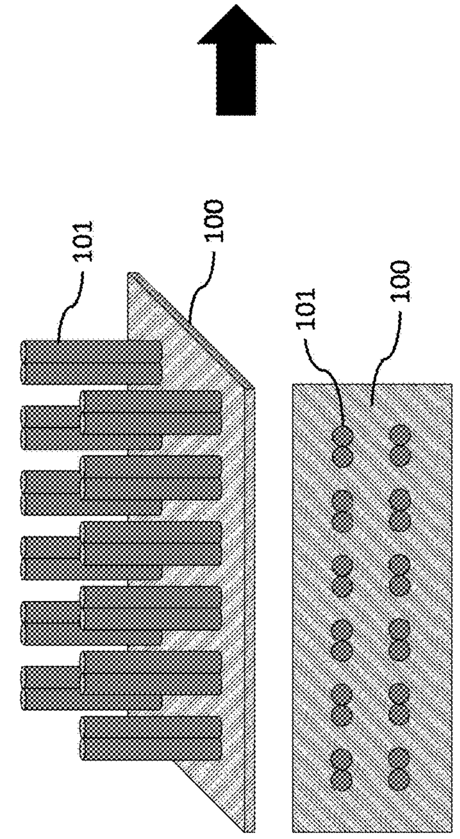
FIGS. 1A, 1B, 1C, and 1D are schematic drawings illustrating the fabrication process of a metal-based or semiconductor-based plasmonic device.

A method for fabricating a plasmonic device with controllable nanostructured features is disclosed, enabling effective plasmonic effects for detectors and sensors such as chemo- and/or biosensing devices. The following detailed description with reference to the drawings illustrates the spirit and essence of the disclosed technique. The illustrative embodiments and examples in the description, drawing, and claims are not meant to be limiting. Other embodiments may be utilized, and other changes may be made, without department from the spirit of the subject matter presented here.

The term "substrate" may denote a substrate itself, or a stack structure including a substrate and predetermined layers or films formed on a surface of the substrate. In addition, the term "surface of a substrate" may denote an exposed surface of the substrate itself, or an external surface of a predetermined layer or a film formed on the substrate.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/".

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, or as "contacting" or "in contact with" another element (or using any form of the word "contact"), there are no intervening elements present at the point of contact.

Embodiments described herein will be described referring to plan views and/or cross-sectional views by way of ideal schematic views. Accordingly, the exemplary views may be modified depending on manufacturing technologies and/or tolerances. Therefore, the disclosed embodiments are not limited to those shown in the views, but include modifications in configuration formed on the basis of manufacturing processes. Therefore, regions exemplified in figures may have schematic properties, and shapes of regions shown in figures may exemplify specific shapes of regions of elements to which aspects of the invention are not limited.

Spatially relative terms, such as "beneath," "below," "lower," "above," "upper," "top," "bottom," and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly. Items described in the singular herein may be provided in plural, as can be seen, for example, in the drawings. Thus, the description of a single item that is provided in plural should be understood to be applicable to the remaining plurality of items unless context indicates otherwise.

When a layer or area is referred to as being "on" (or formed "on" or deposited "on" etc.) another layer or area, it may be directly on the other layer or area, or intervening layers or areas may be present therebetween. Conversely, when a layer or area is referred to as being "directly on" (or formed "directly on" or deposited "directly on" etc.) another layer or area, intervening layers or areas are absent therebetween.

In the drawings, the size and relative sizes of layers and regions may be exaggerated for clarity. Like numbers refer to like elements throughout. Though the different figures show variations of exemplary embodiments, these figures are not necessarily intended to be mutually exclusive from each other. Rather, as will be seen from the context of the detailed description below, certain features depicted and described in different figures can be combined with other features from other figures to result in various embodiments, when taking the figures and their description as a whole into consideration.

In an example, a metal-based plasmonic device fabrication method and related applications are disclosed. Sacrificial nanostructures of removable materials are formed on a rigid or flexible substrate. In case of a metal-based plasmonic device, a layer of supporting material is deposited, which can be a rigid (e.g., metal, oxide, nitride), flexible (e.g., polydimethyl siloxane), or elastic material (e.g., styrene-butadiene copolymer) depending on whether a rigid, flexible, or elastic plasmonic device is desired. Then, a layer of plasmonic metal (e.g., Au, Ag) is then deposited. This overlayer can be deposited by chemical vapor deposition (CVD), atomic layer deposition (ALD) and physical vapor deposition (PVD).

In another example, a graphene-based plasmonic device fabrication method and related applications are disclosed. Sacrificial nanostructures of removable materials are formed on a rigid or flexible substrate that can facilitate or catalyze graphene synthesis, for instance, Ni or Cu. If another substrate is used, a layer of such material that can facilitate or catalyze graphene synthesis is first deposited after printing the sacrificial nanostructures. Graphene is then synthesized on the substrate surface through CVD methods. Depending on the nature of the substrate and processing condition, a monolayer and/or few-layer graphene can be prepared. Then, a layer of supporting material is deposited onto the graphene, which can be a rigid substrate (e.g., oxide, nitride), a flexible substrate (e.g., polydimethyl siloxane), or substrate made from an elastic material (e.g., styrene-butadiene copolymer) depending on whether a rigid, flexible, or elastic plasmonic device is desired.

The rigid substrate for either metal-based or graphene-based plasmonic device can be a transmissive substrate (e.g., glass, quartz, sapphire) or an opaque substrate (e.g., metal, polymer, ceramic), depending on considerations such as whether light illumination or light transmission is to be used for the specific application or device configuration.

Further, the rigid substrate for either metal-based or graphene-based plasmonic device can be optionally removed, depending on whether fluid or gas is required to pass through the plasmonic device in the specific application or device configuration.

The supporting layer for either a metal-based or graphene-based plasmonic device can be metal, non-metal, organic, inorganic and biomaterial, or a combination of these materials.

In one configuration, the material forming the nanostructures is a removable material, which may be removed by a solvent, by heat, chemical treatment, physical treatment, or a combination of these techniques. The shape and morphology of the nanostructures are such that plasmonic hotspots can form after removal of the nanostructures when electromagnetic energy is incident in that area during operation of the device. A plasmonic hotspot can be a region, such as a small gap, where an intense electric field and thus plasmonic effect can be produced under light illumination.

Figure 5A:
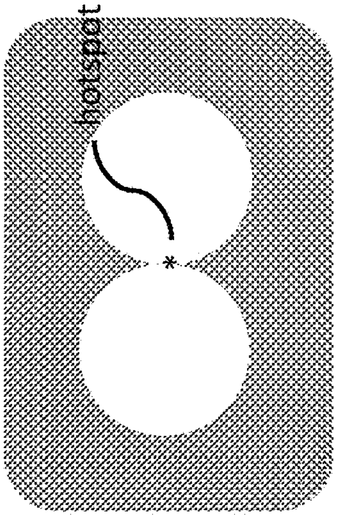
FIGS. 5A-5F illustrate examples of removable nanostructures (top view) which can lead to plasmonic hotspots (denoted with *), where
Figure 5B:
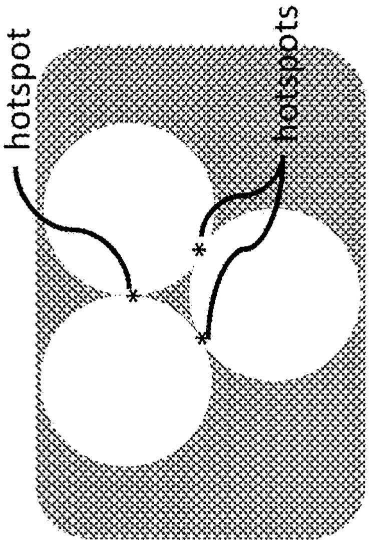
Figure 5C:
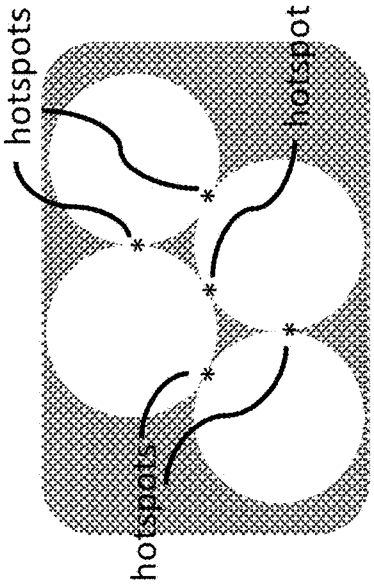
Figure 5D:
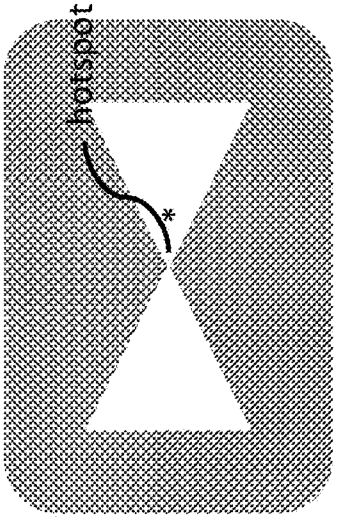
Figure 5E:
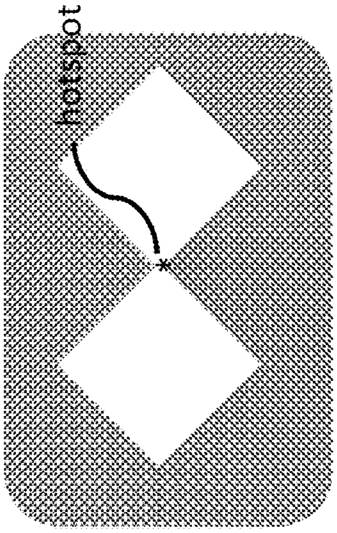
Figure 5F:
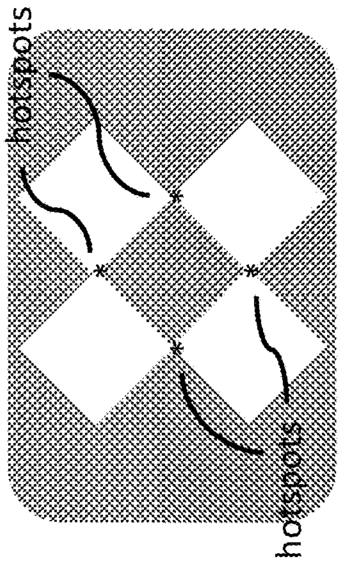

FIGS. 5A-5F illustrate examples of removable nanostructures (top view) which can lead to plasmonic hotspots (denoted with *), where FIG. 5A illustrates one hotspot from a bi-circular pattern, FIG. 5B illustrates three hotspots from a tri-circular pattern, FIG. 5C illustrates five hotspots from a tetra-circular pattern, FIG. 5D illustrates one hotspot from two opposite triangles, FIG. 5E illustrates one hotspot from two squares, and FIG. 5F illustrates four hotspots from a cluster of four squares.

The removable nanostructures can be deposited such as by printing, e.g. using 3D printing, nano-imprint, dip-pen lithography, laser writing or other suitable printing technique. The printing technique used can be any technique capable of printing high-aspect ratio nanostructures and may have high aspect-ratio up to a height-to-width ratio of 20.

Fabrication Process of Metal-Based and Semiconductor-Based Plasmonic Device

Figure 1B:
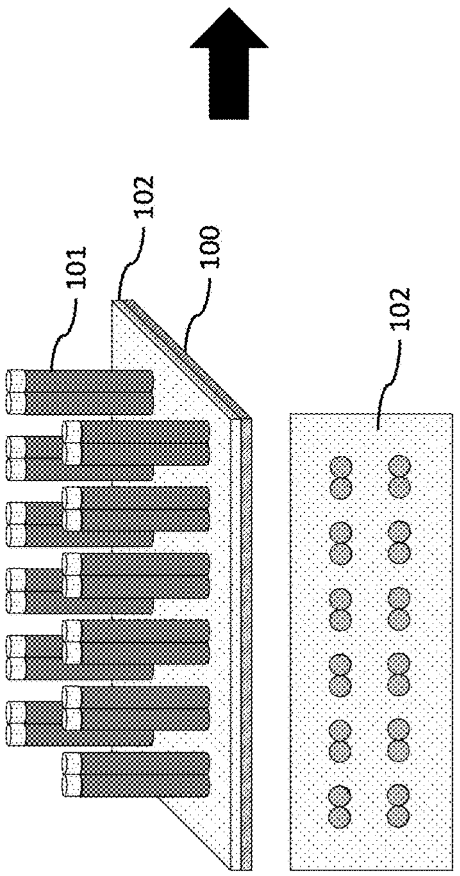
Figure 1D:
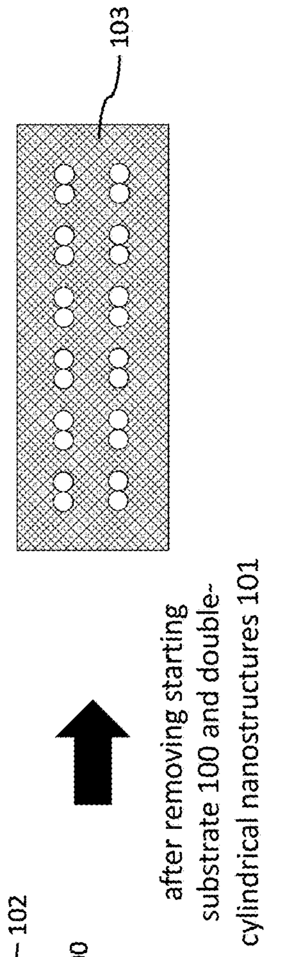

FIGS. 1A-1D are schematic drawings illustrating a basic fabrication process of a metal-based plasmonic device on a starting substrate 100. FIG. 2 is a flow chart showing a fabrication process of plasmonic metal-based or semiconductor-based plasmonic device. As can be seen in FIG. 1A, a plurality of nanostructures 101 are formed on substrate 100. Then, a supporting layer 102 is deposited (FIG. 1B). Nanoscale structure 101 can be 3D-printed or fabricated using lithographic techniques or other nanofabrication techniques. If printing such as 3D-printing is used, a process to form the nanostructures 101 can be a printing process that leads to formation of a three-dimensional object layer-by-layer using a digital file (e.g. a 3D computer aided design (CAD) file). For example, the 3D-printing can be an additive process whereby layers of material are built up to create a 3D structure.

The double cylindrical nanostructure 101 is for exemplary purposes only, and other shapes, layouts, dimensions etc. can be used. Compared with lithographic techniques, 3D-printing may have advantages in the disclosed technique because of its ease and lower cost of operation. It also offers a higher degree of freedom and flexibility in designing the nanoscale features. Advantageously, 3D-printing achieves high-aspect ratio nanoscale structures, which is difficult with conventional lithographic techniques. However, other deposition methods can be utilized as mentioned previously.

Advantageously, nanostructures 101 may be made of dissolvable material that can removed by solvent, by heat, or other appropriate treatment. For example, the material can be poly methyl methacrylate (PMMA) that can be removed by acetone. For some materials used for layer 101, heat or UV curing may be desired to obtain nanostructures that can better survive subsequent processes.

The supporting layer 102 deposited onto the structure in FIG. 1B can be made of a rigid (e.g., oxide, nitride), flexible (e.g., polydimethyl siloxane or other siloxane or silicone based material), or elastic material (e.g., styrene-butadiene copolymer) depending on whether a rigid, flexible, or elastic plasmonic device is desired.

A sacrificial interlayer also made of a dissolvable material can be added between layers 100 and 102 to assist in the removal of layer 102 from substrate 100. This sacrificial interlayer can be of the same material as for 101, or another removable material that can be easily removed by solvent, by heat, or other appropriate treatment.

Figure 1C:
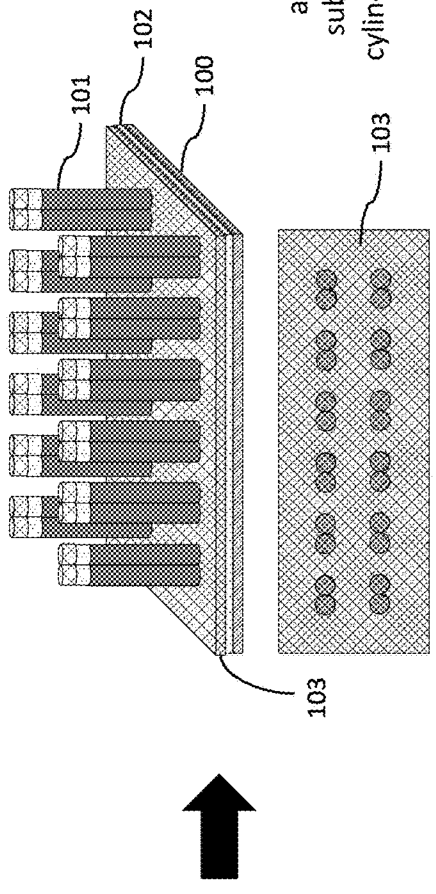
Figure 2:
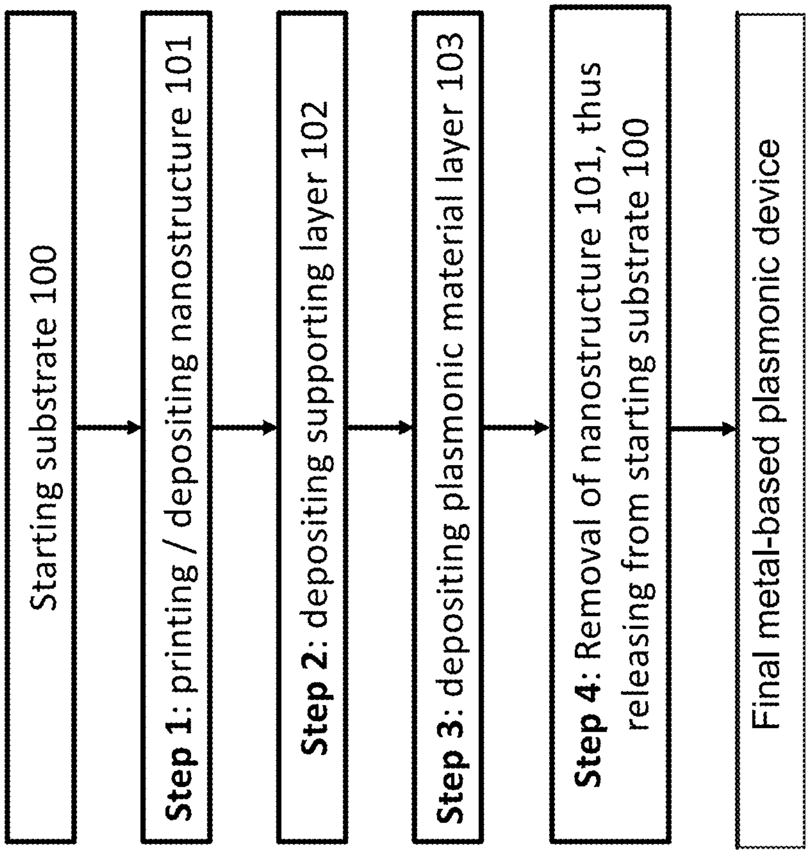
FIG. 2 is a flow chart showing a fabrication process of plasmonic metal-based or semiconductor-based plasmonic device.

A plasmonic material layer 103 is then deposited onto the supporting layer 102 as illustrated in FIG. 1C. Examples of plasmonic metal are Au, Ag, Cu, Al, Mg, Pt, and Rh, which have been widely explored both experimentally and theoretically. Non-metal plasmonic materials include extrinsically doped oxides and semiconductors such as Sn-doped $In_2O_3$ (ITO), Al-doped ZnO (AZO), Sb-doped $SnO_2$, In-doped CdO, and Ne-doped $TiO_2$; and self-doped oxides and semiconductors such as copper-deficient chalcogenides ($Cu_{2-x}E$, E=S, Te, Se), $MoS_{2-x}$ and oxygen-deficient transition metal oxides, including $TiO_{2-x}$, $WO_{3-x}$, $MoO_{3-x}$, and ZnO.

Nanostructures 101 are then dissolved or removed by one or more of a solvent, heat, chemical treatment, and physical treatment.

In another example, the substrate 100 is not separated from supporting layer 102 (and no sacrificial layer is deposited between substrate 100 and supporting layer 102). In such a case, after dissolving nanostructures 101, a metal-based plasmonic device on a substrate 100 is obtained with tailor-designed hotspots exhibiting plasmonic effects for various applications.

If the example with a sacrificial layer between layers 100 and 102, the sacrificial layer will dissolve together with the removal of nanostructures 101, so as to remove substrate 100, such that a free-standing metal-based plasmonic device in membrane form with thru holes or cavities is obtained as it is released from the substrate 100.

Regardless of the presence of a sacrificial layer between 100 and 102, if the substrate 100 is made of removable material and can be removed together with the nanostructures 101 (and the sacrificial layer between 100 and 102), a free-standing metal-based plasmonic device in membrane form with thru holes or cavities can also be obtained.

Figures 3A, 3B, 3C, 3D:
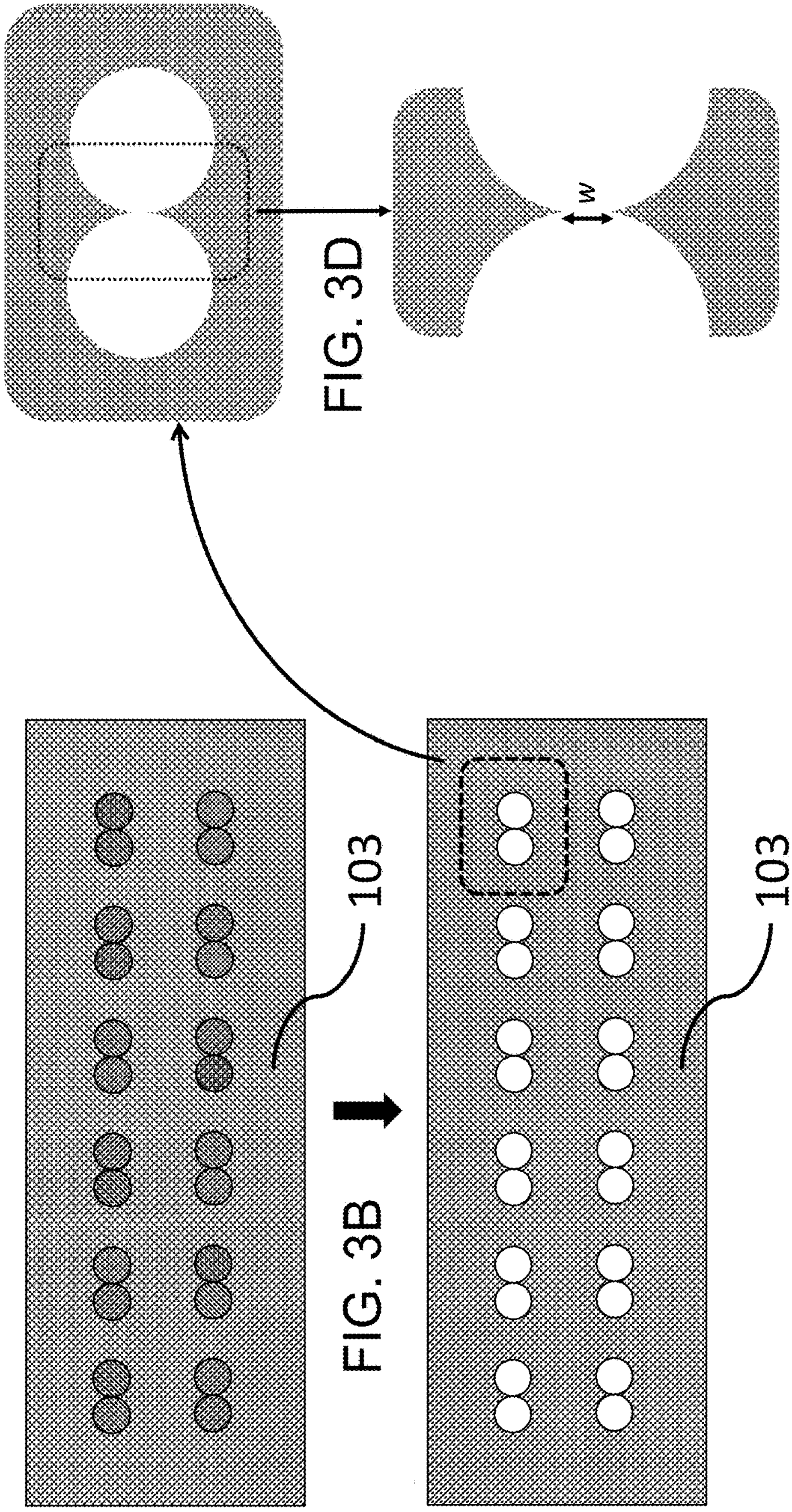
FIG. 3A is a schematic drawing illustrating a top view of the metal-based or semiconductor-based plasmonic device before removal of removable nanostructures.
FIG. 3B is a schematic drawing illustrating a top view of the metal-based, or semiconductor-based plasmonic device before removal of removable nanostructures.
FIG. 3C is a schematic drawing illustrating one of the hotspot features created.
FIG. 3D is a schematic drawing illustrating the magnified top view of one of the hotspot with a gap distance w.

Specific to the double-cylindrical nanostructures used in this description, the plasmonic hotspots formed are the nanoscale metal gaps created after removal of nanostructures 101 (FIGS. 3C and 3D), where w is the gap distance that is critical to the strength of the plasmonic effect exhibited upon light illumination, with w ranges from sub-nanometer to 100 nm.

Figure 4B:
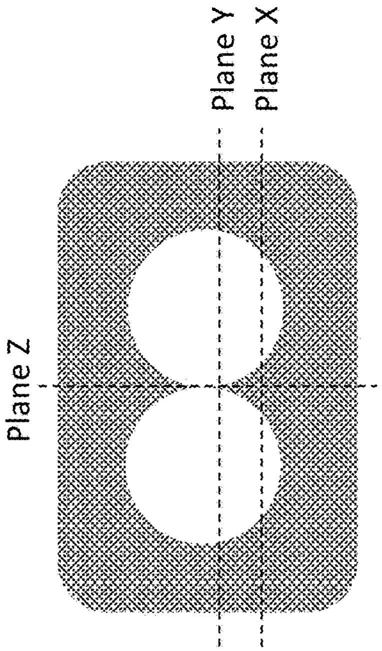
FIG. 4B illustrates a top view of a part of device including one double-cylindrical cavity after removal of the nanostructures.
Figure 4A:
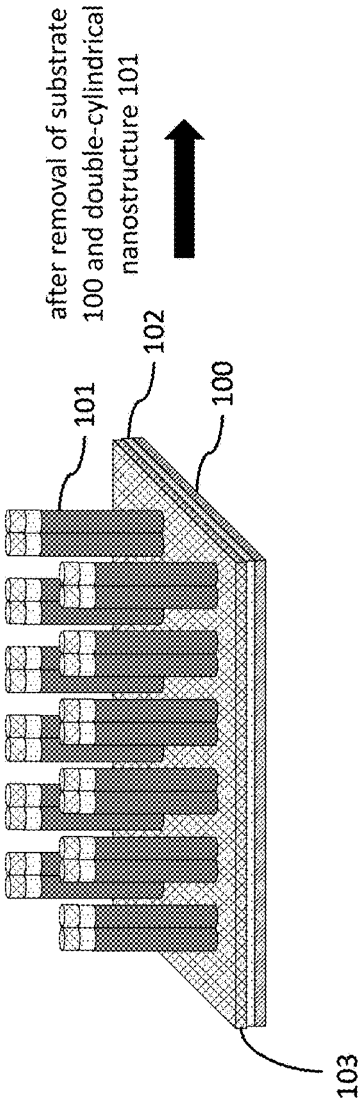
FIG. 4A illustrates a metal-based or semiconductor-based plasmonic device before removal of removable nanostructures.

To facilitate better visualization of the formation of gap w, FIG. 4A shows the metal-based plasmonic device before removal of substrate 100 and nanostructures 101. FIG. 4B shows the device after their removal.

Figure 4C:
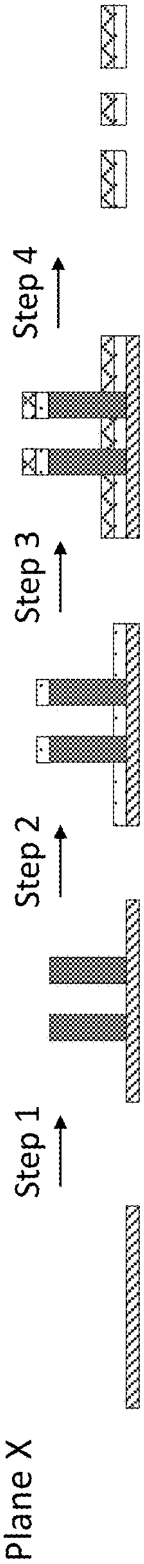
FIGS. 4C, 4D, and 4E illustrate cross-sectional views at different positions across the double-cylindrical nanostructure after each step of fabrication.
Figure 4D:
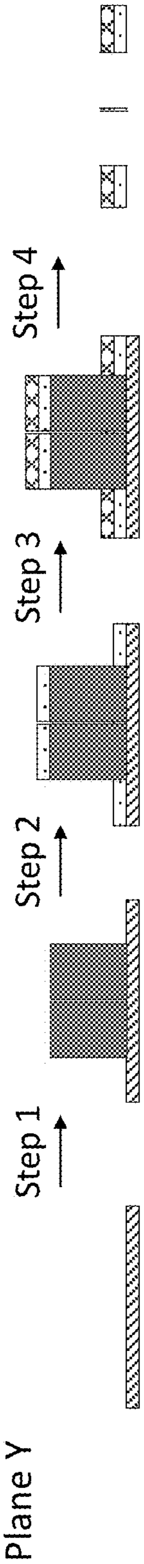
Figure 4E:
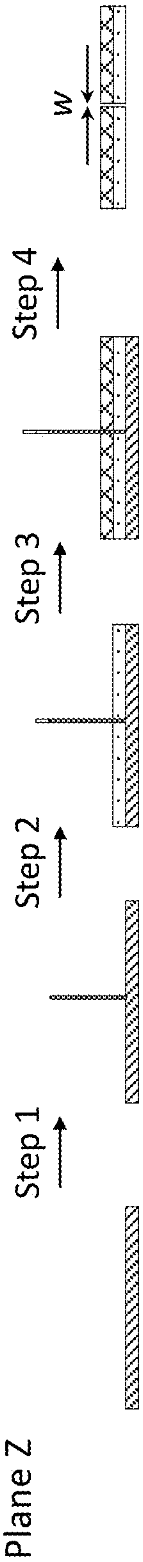

FIGS. 4C, 4D and 4E shows the cross-sectional views along Plane X, Plane Y and Plane Z as denoted in FIG. 4B. For example, w can be selected to be within the range of from 10 to 85 nm, or w can be selected to be less than 10 nm (e.g. from 1 to 10 nm). Alternatively, w can be less than 1 nm, e.g. from 0.2 to 0.9 nm. As such, the gap distance w of metal-based plasmonic hotspot is tunable and controllable by adjusting the shape, morphology, and arrangement of the nanostructures 101 printed or deposited. In addition, the density and position of hotspots can be accurately and precisely controlled and arranged.

Fabrication Process of Graphene-Based Plasmonic Device

As an alternative to the metal-based and semiconductor-based materials mentioned above, 2D materials can also exhibit plasmonic effects, for instance, graphene, graphene oxides, hexagonal boron nitride, pnictogens, and MXenes (e.g. 2D plasmonic materials that include nitrides, carbides or carbonitrides of early transition metals, including MXenes with a general formula $M_{n+1}X_nT_x$, where M refers to an early transition metal element, X is nitrogen or carbon; and T corresponds to e.g. —O, —F, or —OH surface termination).

Figures 6A, 6B:
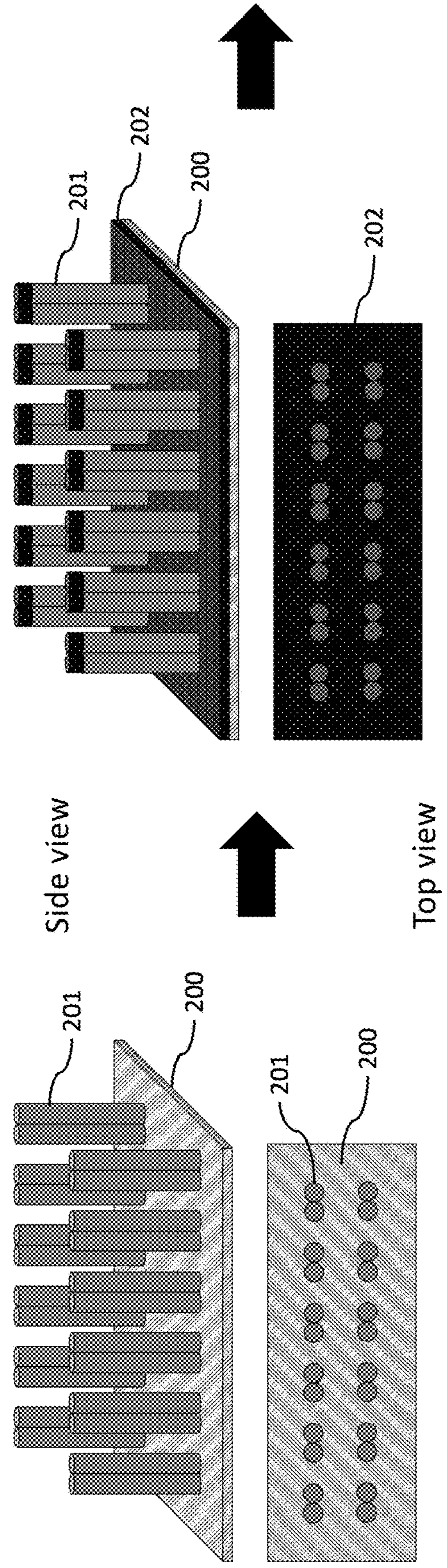
FIGS. 6A, 6B, 6C, and 6D are schematic drawings showing the fabrication process of a graphene-based plasmonic device.
Figure 6D:
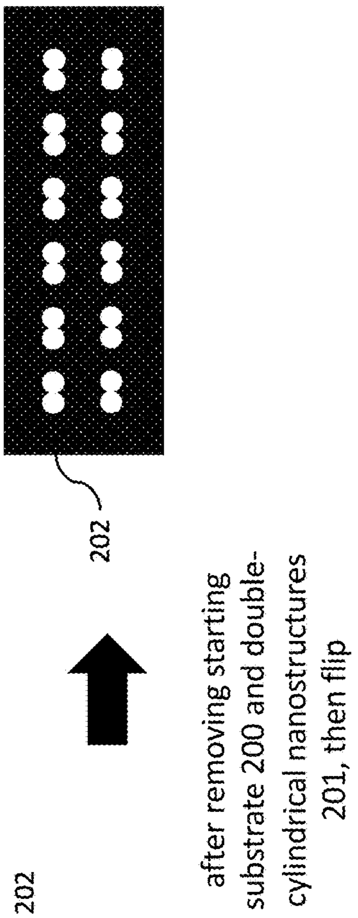

FIGS. 6A, 6B, 6C, and 6D are schematic drawings illustrating a basic fabrication process of a graphene-based plasmonic device. FIG. 7 is a flow chart showing the entire fabrication process of plasmonic graphene-based plasmonic device. As can be seen in FIG. 6A, on a starting substrate 200 nanoscale structures 201 can be 3D-printed or fabricated using lithographic techniques or other nanofabrication techniques. Advantageously, nanostructures 201 may be made of a dissolvable material that can removed by solvent, by heat, or other appropriate treatment. For example, poly methyl methacrylate (PMMA) can be used that can be removed by acetone. For some materials used for nanoscale structures 201, heat or UV curing may be desirable to obtain nanostructures that can better withstand subsequent processes.

The double cylindrical nanostructure 201 is for exemplary purposes only, and other shapes, layouts, dimensions etc. can be used. Compared with lithographic techniques, 3D-printing may have advantages in the disclosed technique because of its ease and lower cost of operation. It also offers a higher degree of freedom and flexibility in designing the nanoscale features. Advantageously, 3D-printing achieves high-aspect ratio nanoscale structures, which is difficult with conventional lithographic techniques. Other deposition methods can be utilized as mentioned previously.

The starting substrate 200 serves as a support for subsequent preparation of nanostructures 201, and to facilitate or catalyze graphene synthesis. Preferably, it is made of Ni, Cu or a transition metal or other material that can facilitate or catalyze graphene synthesis, which can be amorphous, polycrystalline, or single-crystalline form.

If a starting substrate other than a material capable of facilitating or catalyzing graphene is used, a layer of such a material that can facilitate or catalyze graphene synthesis is first deposited before subsequent graphene synthesis.

Graphene layer 202 is then synthesized on the substrate surface through CVD methods (FIG. 6B). Depending on the nature of the substrate and processing condition, monolayer and/or few-layer graphene can be prepared so that different CVD methods can used.

Figure 6C:
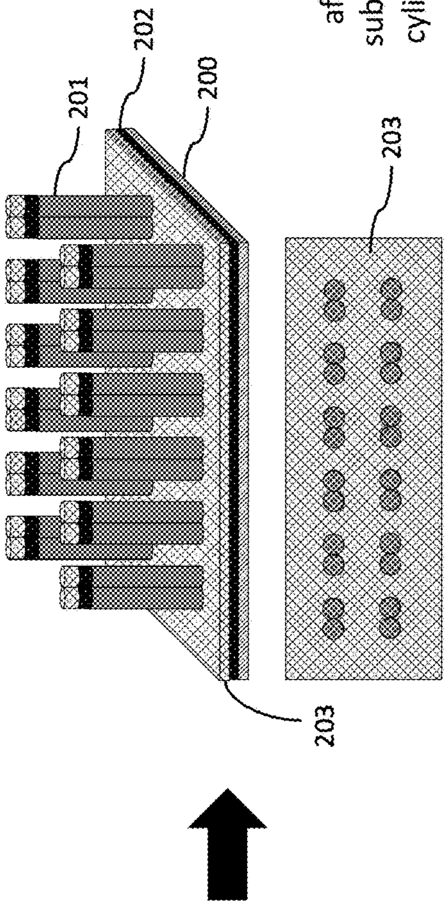
Figure 7:
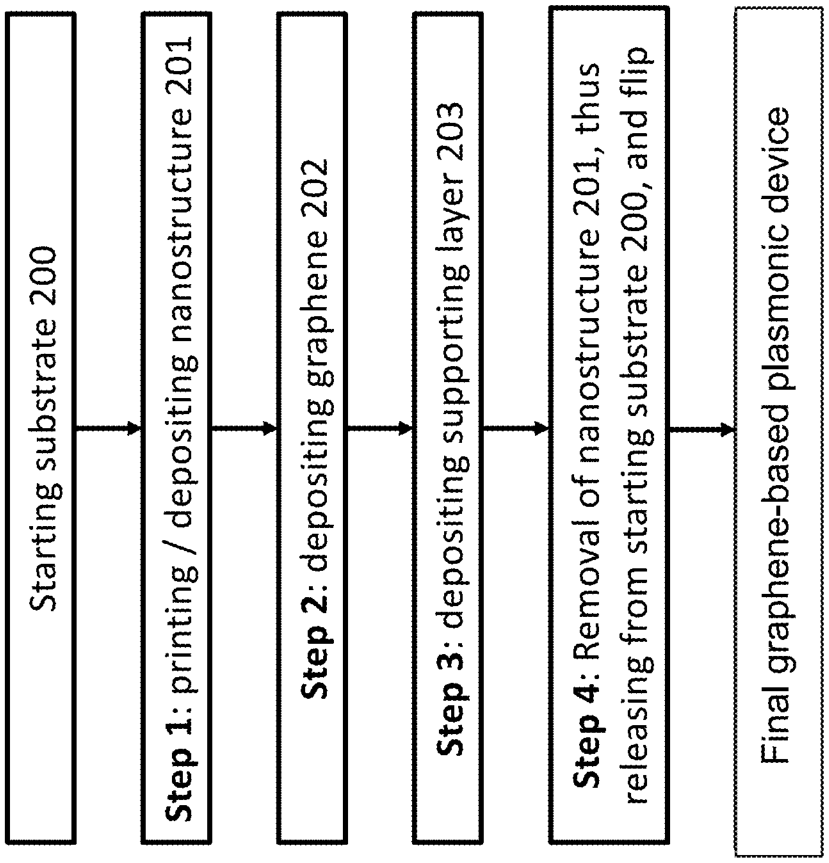
FIG. 7 is a flow chart showing the entire fabrication process of plasmonic graphene-based plasmonic device.

Another overlayer 203, as a supporting layer, is further deposited onto the graphene layer 202 as illustrated in FIG. 6C, which can be made of a rigid (e.g., oxide, nitride), flexible (e.g., polydimethyl siloxane or other siloxane or silicone based material), or elastic material (e.g., styrene-butadiene copolymer) depending on whether a rigid, flexible, or elastic plasmonic device is desired, and which can be also made of metal, non-metal, organic, inorganic and biomaterial, or a combination of these materials.

Nanostructures 201 are then dissolved or removed by one or more of a solvent, heat, chemical treatment, and physical treatment.

After removal of nanostructures 201, the graphene containing multilayer (with graphene sandwiched between overlayer 203 above and starting substrate 200 beneath) obtained is then subjected to metal etching treatment to completely remove substrate 200, or the overlayer deposited before graphene synthesis, if any. For example, if the substrate 200 is Cu that is a common substrate for CVD graphene, the Cu substrate can be removed with 0.05 g/mL aqueous solution of $Fe(NO_3)_3$, followed by copious rinsing with deionized (DI) water.

Figures 8A, 8B, 8C:
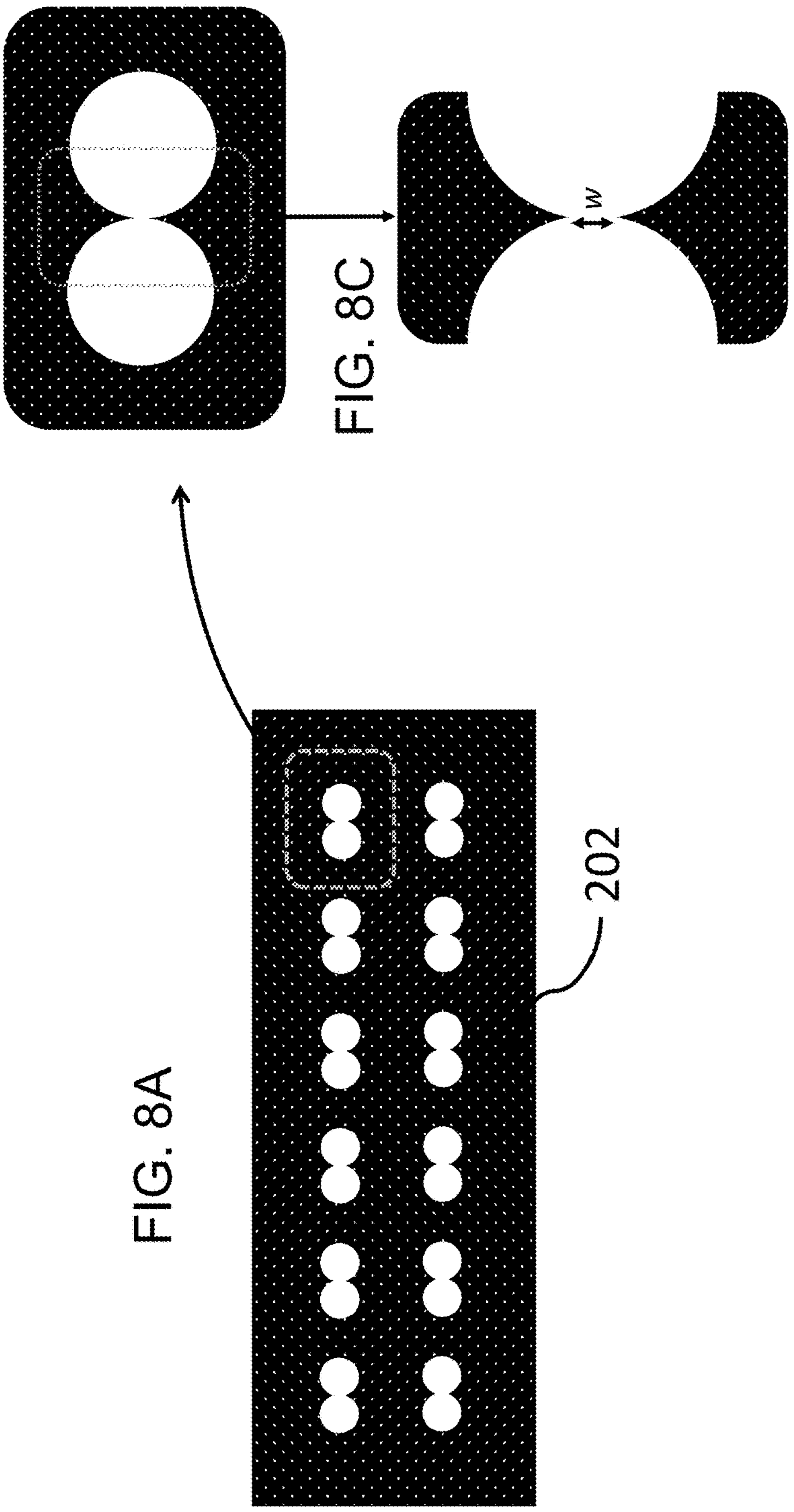
FIG. 8A is a schematic drawing illustrating a top view on the graphene-based plasmonic substrate after removal of removable nanostructures.
FIG. 8B is a schematic drawing illustrating one of the hotspot features created.
FIG. 8C is a schematic drawing illustrating the magnified top view of one of the hotspots with a gap distance w.

After removing nanostructures 201 and substrate 200, the released nanoporous membrane is flipped over, such that a graphene-based plasmonic device can be used and having tailor-designed hotspots exhibiting plasmonic effects for various application (FIG. 8A).

Specific to the double-cylindrical nanostructures used in this description, the plasmonic hotspots formed are the nanoscale gaps within the graphene layer (FIGS. 8B and 8C), where w is the gap distance that is critical to the strength of the plasmonic effect exhibited upon light illumination.

Figures 9A, 9B:
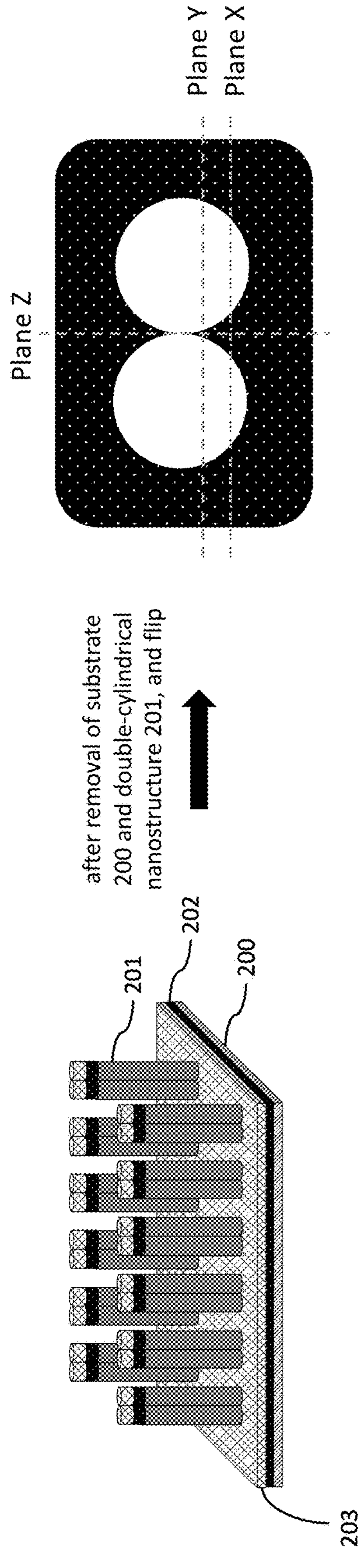
FIG. 9A illustrates a graphene-based plasmonic device before removal of removable nanostructures.
FIG. 9B illustrates a top view of a part of device including one double-cylindrical cavity after removal of nanostructure.

To facilitate better visualization of the formation of gap w, FIG. 9A shows the graphene-based plasmonic device before removal of substrate 200 and nanostructures 201. FIG. 9B shows the device after their removal.

Figures 9C, 9D, 9E:
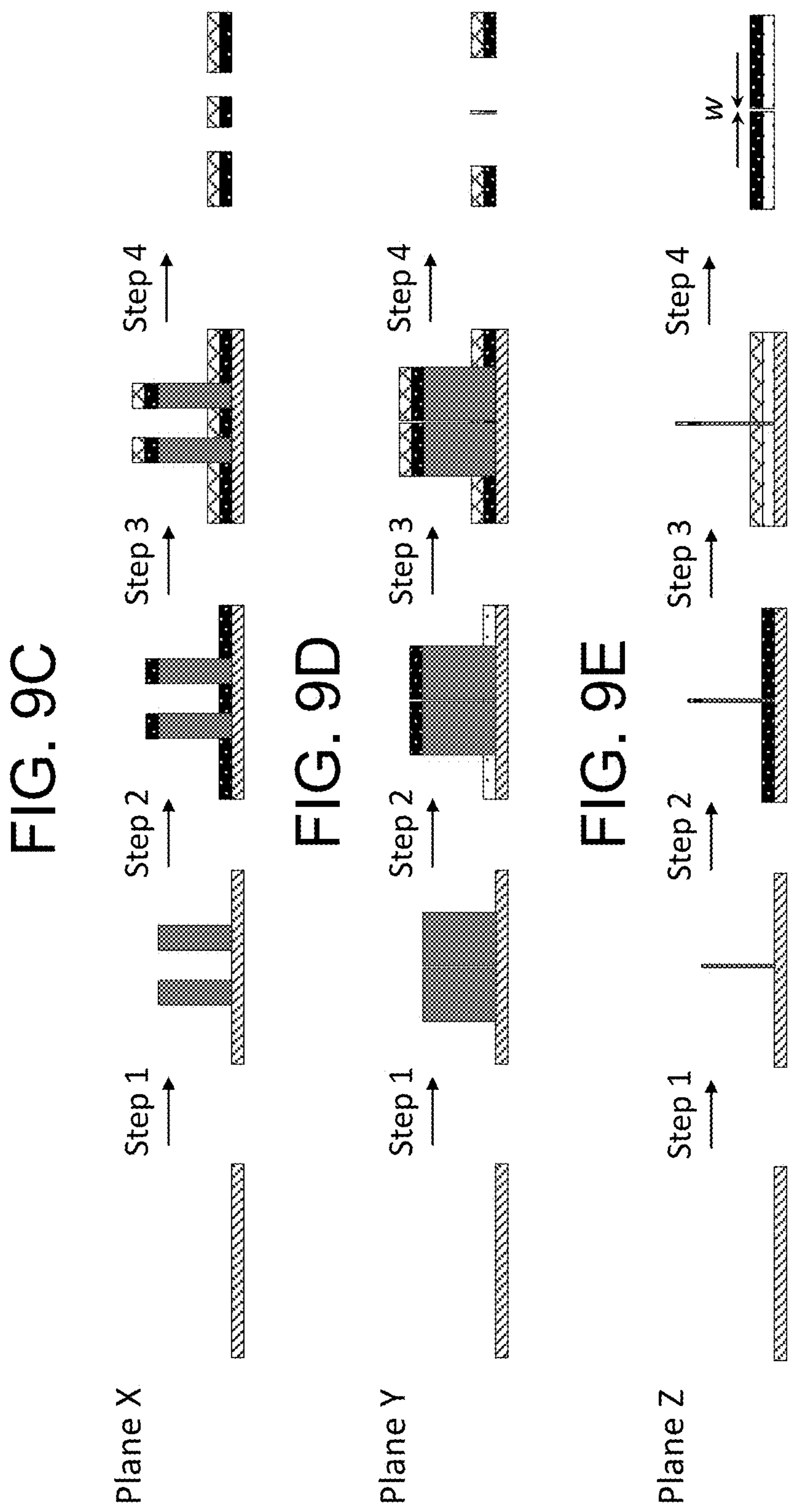
FIGS. 9C, 9D, and 9E illustrate cross-sectional views at different positions across the double-cylindrical nanostructure after each step of fabrication.

FIGS. 9C, 9D and 9E are cross-sectional views (taken along Plane X, Plane Y and Plane Z, respectively, as denoted in FIG. 9B) of the method of forming the plasmonic device.

The gap distance w of the graphene-based plasmonic hotspot is tunable and controllable by adjusting the shape, morphology, and/or arrangement of the nanostructures 201 printed or deposited, with w ranging, as in the metal and semiconductor based examples above, from sub-nanometer to 100 nm. In addition, the density and position of hotspots can also be accurately and precisely controlled and arranged.

A. Plasmonic Test Device for Food Toxins Detection

Plasmonics is a unique field in nanophotonics, in which light energy is confined to a nm-scale oscillating field of free electrons, known as a surface plasmon, with the use of nanostructures or nanoarchitectures offering nanosized region (such as nanogaps, nanoparticular cluster, nanostructure array) for strong coupling of light and the collective oscillation of free electrons at the metal-dielectric interface. Such coupling enables significant enhancement and localization of resonance field and amplification of optical response.

For example, the Raman scattering signals from molecules within the nanogap can be much enhanced, resulting in surface-enhanced Raman scattering (SERS). Raman scattering is the inelastic scattering of photons by matter, leading to both an exchange of energy and a change in the direction of light. While different molecules have their characteristic scattering modes and patterns, giving their unique fingerprint Raman spectra, Raman scattering can be used for molecular identification. When a molecule falls within a hotspot, for example a nanogap of plasmonic material, plasmonic effect exhibited due to light confinement within the nanoscale space can enhance the Raman scattering signals (i.e., SERS), which can significantly facilitate chemical analysis and identification in molecular level.

Another example is the enhanced (or extraordinary) optical transmission brought by surface plasmons (SP-EOT) from the coupling between light and a nanopore array. The periodic array of nanopores acts as a diffraction grating and convert incident light into surface plasmonic waves at resonance wavelengths, thereby creating a series of intense peaks in the optical transmission spectra. Attachment or adsorption of analyte molecule or species on the nanopore array can change the optical transmission characteristics.

The size, shape, arrangement, and composition of the nanostructures can also be designed and engineered to control the properties of the plasmons, e.g., resonance frequency and localization, thus enabling different applications in various field.

A plasmonic device such as disclosed above can be used, for example, to wipe a food sample surface (e.g., fruit, vegetable) to collect chemicals and substances on the surface, which would be transferred and attached onto the plasmonic device with hotspots after wiping. The device is then subjected to analysis based on plasmonic effects, such as SERS or SP-EOT for rapid identification of target toxin molecules, and even quantitative analysis if appropriate calibration is performed.

Food toxins detection can also be achieved by extracting sample fluid from the food sample by pressing, grinding, squeezing, or any other suitable method. The collected sample fluid is then dropped onto the plasmonic device for subsequent analysis based on plasmonic effects, such as SERS or SP-EOT for rapid identification of target toxin molecules, and even quantitative analysis if appropriate calibration is performed.

B. Plasmonic Test Filter for Collection and Detection of Analyte in Air or Solution A plasmonic device as disclosed above can also be provided in the form of a nanopore array membrane, it can be used to collect analyte by allowing a gas or liquid to pass through the plasmonic nanopore array membrane. The analyte molecules trapped in the cavities, particularly those within the hotspots, can be analyzed by analysis based on plasmonic effects, such as SERS or SP-EOT for rapid identification of target analytes.

Figures 10A, 10B:
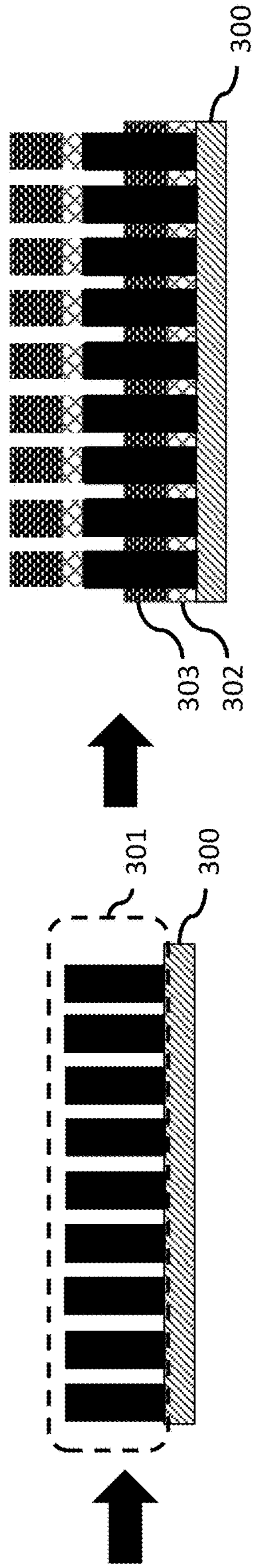
FIGS. 10A, 10B, 10C, and 10D are schematic drawings illustrating the fabrication process of a plasmonic test filter for collection and detection of analyte in air or solution.
Figures 10C, 10D:
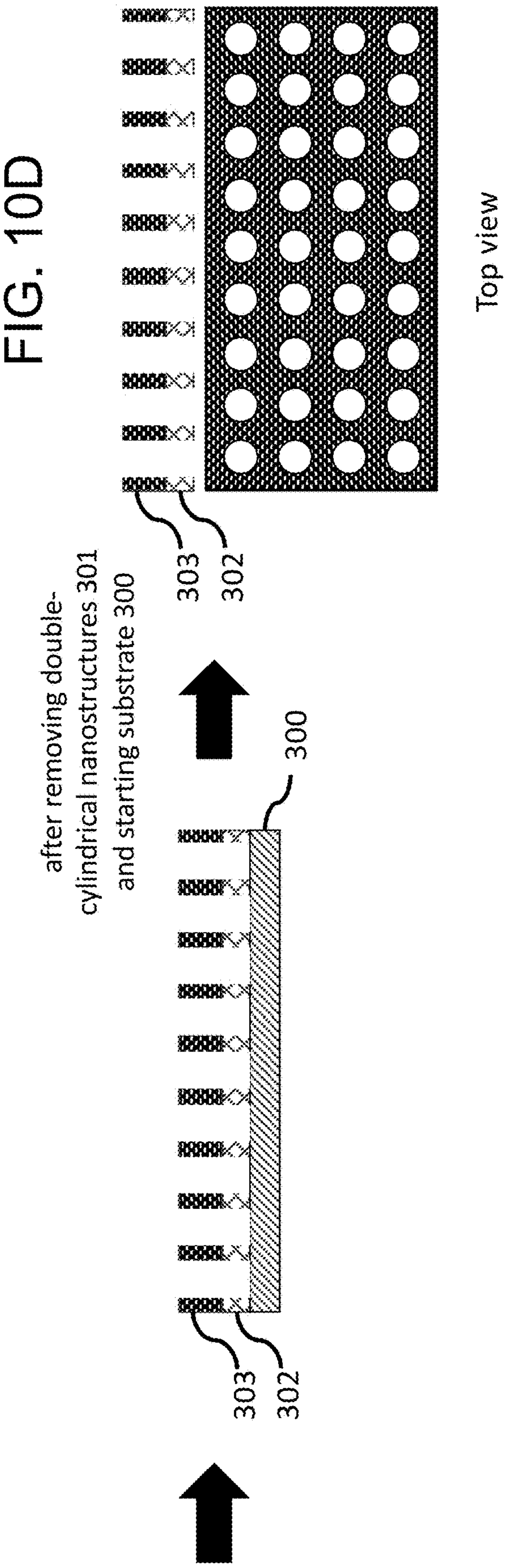

FIGS. 10A-10D are schematic drawings illustrating a basic fabrication process of a metal-based plasmonic device. As seen in FIG. 10C, on a starting substrate 300, nanopillars 301 can be 3D-printed or fabricated using lithographic techniques or other nanofabrication techniques. 3D-printing has the benefit of ease and lower cost of operation, as well as a high degree of freedom and flexibility in designing the nanoscale features. Advantageously, 3D-printing achieves high-aspect ratio nanoscale structures, which is difficult with conventional lithographic techniques. However, other deposition methods can be utilized as mentioned previously.

Advantageously, nanopillars 301 may be made of dissolvable material that can removed by solvent, heat, or other appropriate treatment. For example, if poly methyl methacrylate (PMMA) is used, it can be removed e.g. by acetone. For some materials used for layer 301, heat or UV curing may be desirable to obtain nanopillars that can survive subsequent processes.

A supporting layer 302 is deposited (FIG. 10B), which can be made of a rigid (e.g., metal, oxide, nitride), flexible (e.g., polydimethyl siloxane), or elastic material (e.g., styrene-butadiene copolymer) depending on whether a rigid, flexible, or elastic plasmonic device is desired.

A sacrificial interlayer made of the same dissolvable material is added between layers 300 and 302 if supporting layer 302 cannot be easily detached from starting substrate 300. This sacrificial interlayer can be of the same material as for 301, or other removable material that can be easily removed by solvent, by heat, or other appropriate treatment.

A plasmonic material layer 303 is then deposited onto the supporting layer 302 (FIG. 10B). Examples of plasmonic metals are Au, Ag, Cu, Al, Mg, Pt, and Rh, and examples of non-metal plasmonic materials include extrinsically doped oxides and semiconductors such as Sn-doped $In_2O_3$ (ITO), Al-doped ZnO (AZO), Sb-doped $SnO_2$, In-doped CdO, and Ne-doped $TiO_2$; and self-doped oxides and semiconductors such as copper-deficient chalcogenides ($Cu_{2-x}E$, E=S, Te, Se), $MoS_{2-x}$ and oxygen-deficient transition metal oxides, including $TiO_{2-x}$, $WO_{3-x}$, $MoO_{3-x}$, and ZnO.

Finally, nanopillars 301 (and the sacrificial layer between layers 300 and 302, if present) are then dissolved or removed by one or more of a solvent, heat, chemical treatment, and physical treatment. After this final treatment, a free-standing plasmonic nanopore array membrane is obtained. The dimension of the 3D-printed or deposited nanopillars would dictate the dimension and morphology of the nanocavity to be constructed. For example, if 500 nm wide circular nanopillars are 3D-printed, cylindrical nanochannels with a diameter of around 500 nm are formed in the plasmonic nanoporous membrane. As such, there is extremely high manufacturing flexibility and control of the dimension of the nanocavity required in the plasmonic nanoporous membrane. For example, an advanced commercial 3D printer could be used that can achieve a linewidth of 50 nm.

3D printing objects with a feature size of approximately 100 nm can be achieved such as by 'two-photon absorption', which involves using femtosecond lasers to achieve precision 3D photon absorption that polymerizes and solidifies a liquid resin that is sensitive to light. Alternatively, 'two-step absorption' can be used where a special photoinitiator called benzil together with a single light source is used to create polymerization and solidification.

Figure 11:
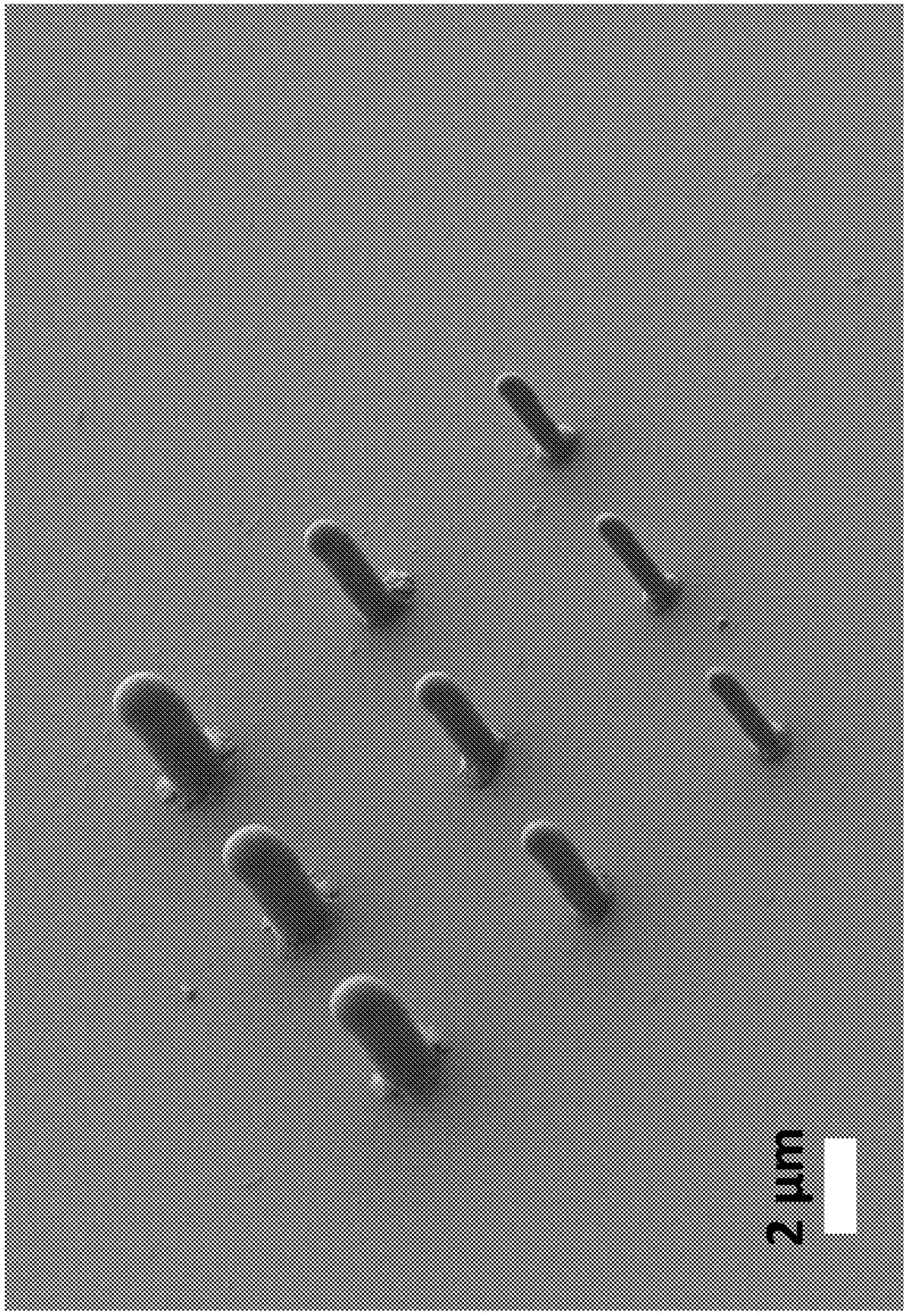
FIG. 11 is a scanning electron micrograph (SEM) image showing the photoresist nanopillars prepared by 3D printing.

FIG. 11 is a scanning electron micrograph (SEM) image showing photoresist nanopillars prepared by 3D printing. The SEM shows an example of a 3×3 array of photoresist nanopillars 3D printed on a silicon substrate. The array has three rows of nanopillars of three diameters: 1125 nm, 750 nm, and 500 nm. All of them are 2 μm tall.

The descriptions and examples herein are intended as non-limiting examples to serve to demonstrate the disclosed technology and can be modified by one having ordinary skill in the art to which the claimed invention pertains within the scope of the subject matter of the claimed invention. On the other hand, the present invention is not limited by the examples disclosed in the specification of the subject application, and the scope of the present invention should be interpreted based on the claims, and to include all techniques that are within the equivalent scope.

From the foregoing, it will be appreciated that various embodiments of the present disclosure have been described herein for purposes of illustration. The present invention is not limited necessarily to the embodiments specifically disclosed, but that substitutions, modifications, and variations may be made to the present invention and its uses without departing from the spirit and scope of the invention. Accordingly, the various embodiments disclosed herein are not intended to be limiting, with the true scope and spirit being indicated by the following claims.

What is claimed is:

1. A method of fabricating a plasmonic device comprising:

fabricating a plurality of structures that are nanostructures or microstructures having a feature size of from 1 to 1000 nm on a substrate, at least two structures of the plurality of structures contacting each other at a contact region;

forming a layer of a plasmonic material on the substrate; and removing the plurality of structures to form a pattern having first and second plasmonic material portions spaced apart from each other and having a gap therebetween of less than 100 nm, so as to produce the plasmonic device having a plasmonic hotspot at said gap, wherein the gap corresponds to the contact region between the at least two structures.

2. The method of fabricating the plasmonic device of claim 1, wherein the fabricating of the structures comprises printing the structures on the substrate.

3. The method of fabricating the plasmonic device of claim 2, wherein the printing of the structures comprises formation of a three-dimensional object layer by layer using a digital file.

4. The method of fabricating the plasmonic device of claim 2, wherein after printing the structures on the substrate, wherein the layer of the plasmonic material is substantially all metal that forms a metal layer on the substrate and on the structures, followed by removal of the structures printed on the substrate.

5. The method of fabricating the plasmonic device of claim 4, wherein the metal and the gap for the plasmonic hotspot are capable of exhibiting a plasmonic effect when irradiated with electromagnetic radiation.

6. The method of fabricating the plasmonic device of claim 5, wherein the metal comprises Au, Ag and/or Cu.

7. The method of fabricating the plasmonic device of claim 1, wherein a supporting layer is deposited on the substrate before and/or after fabricating the structures.

8. The method of fabricating the plasmonic device of claim 1, wherein the structures are removed by heat, chemical treatment and/or physical treatment.

9. The method of fabricating the plasmonic device of claim 8, wherein the structures are formed of a photoresist material comprising an organic photoresist material or a hybrid organic-inorganic photoresist material, and the structures are removed with a solvent capable of dissolving the photoresist material.

10. The method of fabricating the plasmonic device of claim 1, wherein the structures are formed of PMMA and are removed with acetone.

11. The method of fabricating the plasmonic device of claim 1, wherein the fabricating of the structures is via 3D printing, nano-imprinting, dip-pen lithography, or laser writing, wherein the structures are formed with an aspect ratio of at least 2, and wherein the aspect ratio is a height to width ratio.

12. The method of fabricating the plasmonic device of claim 11, wherein the aspect ratio is at least 7.

13. The method of fabricating the plasmonic device of claim 12, wherein the aspect ratio is at least 15.

14. The method of fabricating the plasmonic device of claim 4, wherein a thickness of the metal layer deposited is less than 80% of a height of the structures.

15. The method of fabricating the plasmonic device of claim 14, wherein the thickness of the metal layer is less than 60% of the height of the plurality of structures.

16. The method of fabricating the plasmonic device of claim 1, wherein the forming of the layer of the plasmonic material on the substrate comprises growing a graphene layer on the substrate.

17. The method of fabricating the plasmonic device of claim 16, wherein the growing of the graphene layer comprises depositing on the substrate a layer capable of facilitating or catalyzing graphene growth, followed by growing graphene thereon.

18. The method of fabricating the plasmonic device of claim 1, wherein the plasmonic material is a doped metal oxide selected from doped tin oxide, doped zinc oxide, doped cadmium oxide and doped titanium oxide.

19. The method of fabricating the plasmonic device of claim 1, wherein the plasmonic material is a copper deficient chalcogenide or an oxygen deficient transition metal oxide.

20. The method of fabricating the plasmonic device of claim 16, wherein the substrate is a metal capable of facilitating and/or catalyzing graphene, or a metal layer is formed on the substrate which metal layer is capable of facilitating and/or catalyzing graphene.

21. The method of fabricating the plasmonic device of claim 1, wherein a supporting layer is formed on the substrate prior to forming the structures, followed by removal of the structures and removal of the substrate.

22. The method of fabricating the plasmonic device of claim 21, wherein the structures and the substrate are removed at the same time with the same chemical, physical or thermal removal process.

23. The method of fabricating the plasmonic device of claim 1, wherein the substrate comprises a light transmissive material such that the plasmonic device formed is capable of transmitting at least 90% of the light incident thereon in the infrared spectrum, visible spectrum, or UV spectrum.

24. A plasmonic device made from the method of claim 1.

25. A method of fabricating a plasmonic device comprising:

fabricating a plurality of structures on a substrate, each of the plurality of structures having a feature size from 1 to 1000 nm, and two structures of the plurality of structures contacting each other at a contact region;

forming a layer of a plasmonic material on the substrate; and removing the plurality of structures to form a pattern having first and second plasmonic material portions spaced apart from each other across a gap corresponding to the contact region, so as to produce the plasmonic device having a plasmonic hotspot at the gap, wherein a gap distance corresponding to the gap is within a range of 10 nm to 85 nm, and wherein each of the plurality of structures is a nanostructure or a microstructure.

* * * * *